United States Patent [19]

Feldmann et al.

[11] Patent Number: 4,600,090

[45] Date of Patent: Jul. 15, 1986

[54] BRAKE LINING SUPPORT IN DISC BRAKES

[75] Inventors: Joachim Feldmann, Neustadt; Fritz Isernhagen, Wunstof, both of Fed. Rep. of Germany

[73] Assignee: WABCO Fahrzeugbremsen GmbH, Hanover, Fed. Rep. of Germany

[21] Appl. No.: 525,068

[22] Filed: Aug. 22, 1983

[51] Int. Cl.[4] .............................................. F16D 65/12
[52] U.S. Cl. ............................. 188/218 XL; 188/73.2
[58] Field of Search .......... 188/218 XL, 73.2, 250 G, 188/250 F, 250 D, 217; 192/107 R, 70.2

[56] References Cited

U.S. PATENT DOCUMENTS

| 3,452,844 | 7/1969 | Lallemant | 192/107 R |
| 3,605,967 | 9/1971 | Warren et al. | 192/107 R |
| 3,738,457 | 6/1973 | Dowell | 188/218 XL |
| 3,885,650 | 5/1975 | Klaue | 188/71.4 |
| 4,119,179 | 10/1978 | Masclet | 188/218 XL |

FOREIGN PATENT DOCUMENTS

| 1965170 | 7/1971 | Fed. Rep. of Germany . |
| 2320292 | 10/1974 | Fed. Rep. of Germany . |

*Primary Examiner*—Bruce H. Stoner, Jr.
*Assistant Examiner*—Alvin Oberley
*Attorney, Agent, or Firm*—G. P. Baier

[57] ABSTRACT

In a disc brake, a brake lining support forms a brake ring from one or more support segments, each segment having a lining pad or pads attached to such segment so that the resulting force from frictional braking passes through the attachment device that non-rotatably supports the segment.

12 Claims, 4 Drawing Figures

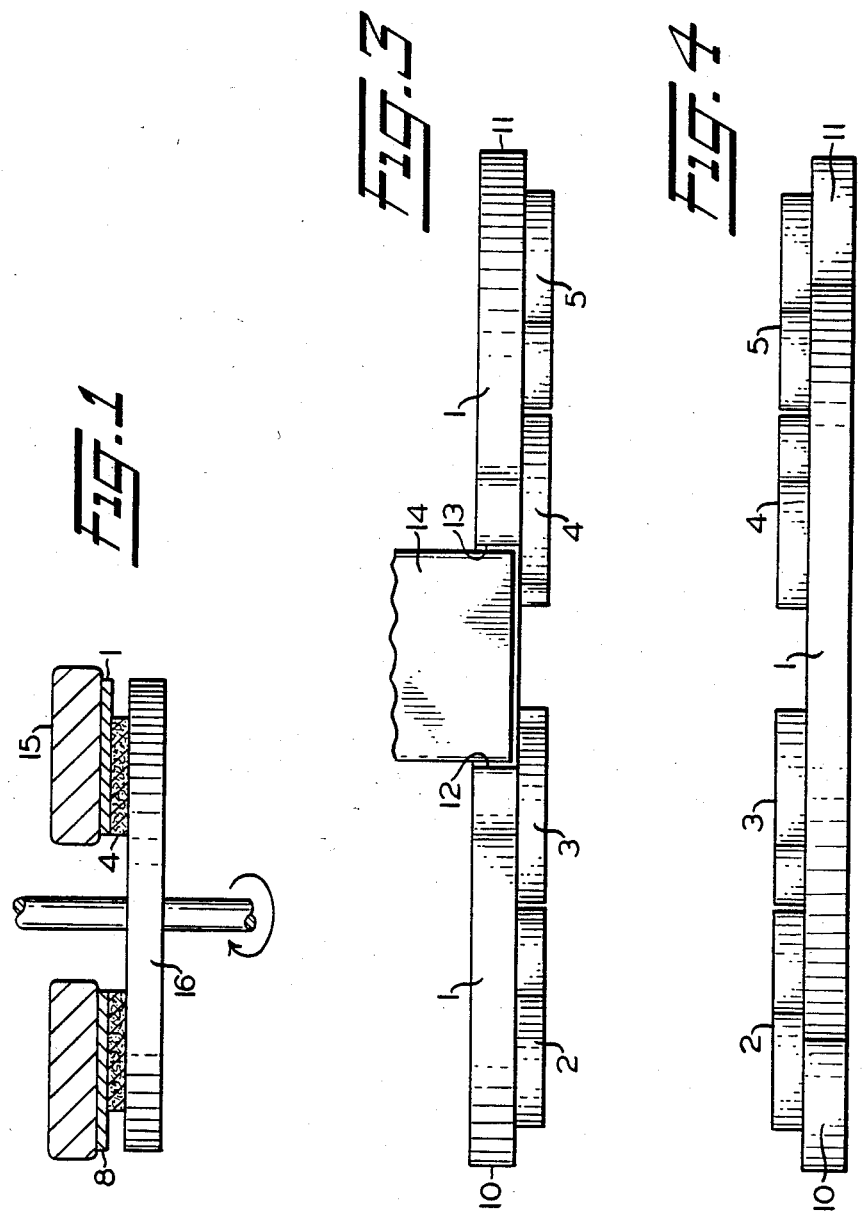

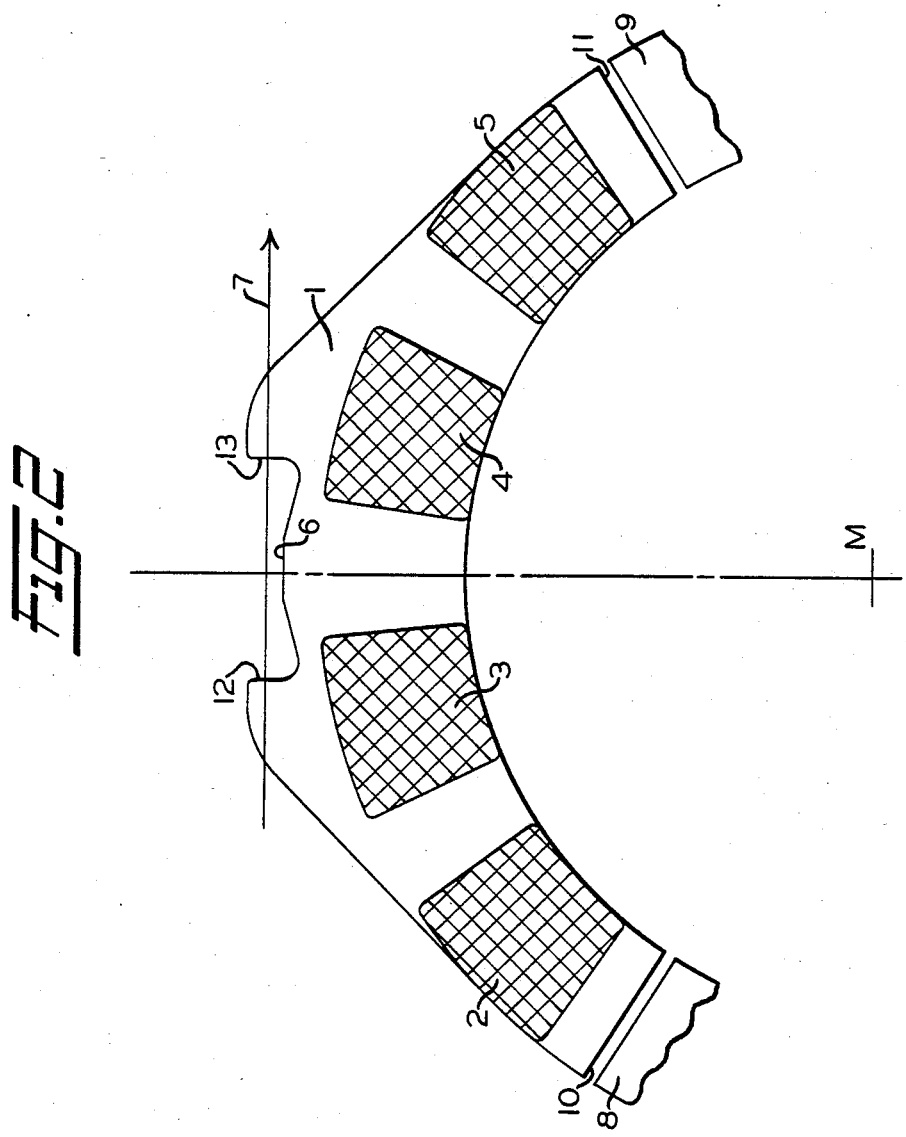

BRAKE LINING SUPPORT IN DISC BRAKES

The invention relates to a brake lining support in disc brakes, particularly in fully-lined disc brakes of motor vehicles.

Generally, disc brakes consist of a rotating part formed of at least one brake disc, or rotor, and a portion which is fixed in the direction of rotation made up of at least one brake lining support which is movable in the axial direction to engage the rotor. The brake lining support serves as the backing element for the brake linings which, during brake application, are in frictional contact with the rotating brake disc.

With fully-lined disc brakes, it is customary to separate the brake lining support into segments, to facilitate the installation when the brake linings have to be replaced on account of wear or for other maintenance reasons. Generally, the brake lining supports consist of two or three segments, which when joined together form the so-called brake ring.

Since the forces acting on the segments of the brake lining support during braking generate a moment of tilt about their point of suspension, it has proven to be appropriate to design the surfaces which connect the segments to one another as interlocking or other form-fitting joints. Such joints must be manufactured to fit so precisely that the movement or tilting of the segments is very limited. In addition, these no-plug joints must also fit so as to allow easy removal of the segments by radial extraction even after use and wear. The manufacturing and fitting costs for these joint surfaces are very high. The above-mentioned moments of tilt specifically cause a tipping or partial rotation of the brake lining support segments around their attachments, i.e., around an axis running parallel to the wheel axis.

The problem addressed by the invention is thus a reduction of the tilting of the brake lining support segments around an axis in their attachments running parallel to the wheel axis caused by moments of tilt during braking. Such reduction allows the segments in the vicinity of their respective joints to remain nearly neutral, and thus do not require any special working for interlocking or fitting.

The undesired tilting is minimized by having the brake lining material configured and arranged on each lining support element, so that the effective line of the resulting force transmitted by the brake linings to the corresponding brake lining support segment passes through that region of the brake lining support segment in which the respective attachment apparatus is located. When total brake lining for a particular wheel is composed of a plurality of such support segments, each having the respective resultant force passing through the respective attachment apparatus, the brake ring is relatively free of tilting moments thereby eliminating the need for expensive and complex mechanical interlocking between adjacent support segments.

The configuration and location of the brake linings on each brake lining support segment are such that the effective line of the resulting force runs through the area in which the attachment apparatus is located, thereby creating conditions so that the brake lining support segment does not tilt. Under these conditions in this area there occur no, or only minimal, moments of tilt which run parallel to the wheel axis. The determination and definition of the above-mentioned effective line of the resulting force can be done using either mathematical or geometrical methods.

Such methods derive a single resultant force having a magnitude, direction, and position which are the summation of the individual frictional forces exerted by the pads and the respective moments of such frictional forces.

The invention is explained in more detail below, on the basis of one example which is illustrated in the drawing.

FIG. 1 shows an arrangement of axially-spaced caliper, rotor, support segment, and brake lining partially fragmented.

FIG. 2 shows a fragmented view of a brake lining support structure in a plane generally perpendicular to the axis of the wheel. The structure is composed of three segments, two segments are partially shown only in the areas adjacent to an intermediate segment 1.

FIG. 3 is an elevational view of the segment 1 with the attachment element 14 shown.

FIG. 4 is a bottom view of segment 1 from FIG. 2.

The FIGS. 1, 2, 3, and 4 show a brake lining support segment 1, which is part of a brake ring consisting of three segments 1, 8, 9. Segment 1 is equipped with four brake linings or pads 2, 3, 4 and 5. The support segment 1 is in axial spaced arrangement between a non-rotating portion, such as a caliper or actuator 15, shown in FIG. 1, and a rotating disc portion or rotor 16, shown in FIG. 1. Such axial arrangement is typical in disc brakes, and the actuator forces frictional contact between the brake lining and the rotor during brake application. As viewed in FIG. 2, a clockwise revolving rotor would contact brake linings 2, 3, 4, 5 and frictionally generate retardation forces on the outwardly facing surfaces of linings 2, 3, 4, 5. Such friction forces may generally be considered extending tangentially clockwise from each of the linings 2, 3, 4, 5. There is an attachment apparatus 6, which allows attachment of the brake lining support segment 1 to an attachment element 14 of the disc brake. The attachment element is connected with a non-rotating portion of the disc brake, usually with a portion of the brake activation element of the disc brake. The forces from linings 2, 3, 4, 5 may be considered as a single resulting force, which would produce the same effect as the total of the respective lining forces including the effect of any rotational moments on the segment 1. Such resulting force of the configuration of brake linings 2, 3, 4, 5, as shown in the FIG. 2, would generally coincide with the line 7. The above-mentioned attachment apparatus 6 is located in a region in which the effective line 7 of the resulting force transmitted from the brake linings 2, 3, 4, 5 to the brake lining support segment 1 runs. The symbol "M" entered on the drawing indicates the position of the wheel axis, which lies parallel to the axis around which individual moments of tilt are imparted to the brake lining support segments 1 during braking. For the configuration shown in FIG. 2, since the resulting force, shown at 7, passes directly through the region of the attachment apparatus 6, there is generally no rotational moments about the area of attachment 6. Such a reduction in tilting or rotation about the region of attachment apparatus permits simple abutment between the adjacent portions of brake lining segments, such as surface 11 adjacent segment 9 and surface 10 adjacent segment 8. The interlocking or dovetailing typical of such multi-segment support plates is replaced by simple inexpensive planar surfaces, such as, 10 and 11, that may lie in a radial plane that are easily manufactured and fitted.

The symmetrical configuration of the brake lining support segment 1 in the example also results in a symmetrical arrangement of the brake linings 2, 3, 4, 5. The symmetrical arrangement shown in FIG. 2 is just one of the possible arrangements provided by this invention. Such symmetrical arrangement also produces a resultant force along line 7 which is generally tangential about the axis M and perpendicularly intersects the abutment portions 12, 13 of attachment apparatus 6. Such abutment portions 12, 13 forcibly contact a lug 14 in FIG. 3 on the non-rotating portion of the brake assembly.

While the presently preferred configuration shown in the drawing is symmetrical, the spatial and functional correspondence of brake linings and attachment apparatus can also be achieved in the same manner with asymmetrical brake lining support segments. This can be beneficial, for example, if the attachment apparatus cannot be installed in the middle of the brake segment.

The magnitude, orientation, and moment of the resultant force depends upon the size of the brake linings, the position of the linings relative to the disc, the coefficient of friction and center of gravity of the linings or pads, the shape of the linings, and other braking variables. Specific embodiments of the invention will use these. Some of these embodiments include: arranging identical brake lining pads on different radii of the brake segment; using a plurality of different shaped brake pads on the same segment; arranging either identical or varying shaped brake pads at differently spaced circumferential positions on the segment; using brake pads with various coefficients of friction; and using friction material whose coefficient varies with position or orientation. All of such embodiments will permit a desirable placement of the attachment apparatus, and have a resultant force that generally passes through the region of the attachment to thereby minimize the rotational moment of tilt about the attachment.

The brake lining can also be one-piece, in which case, the attachment device may then possibly be located inside the annular surface of the brake lining. As will be apparent to those skilled in the art after reviewing the above-described invention, in some instances where the area for the attachment device is a problem, the brake lining can be configured to give the resulting force in the region of the unusual attachment area. In other instances, the brake lining can be configured to give optimum braking considerations, then the resultant force calculated and an appropriate attachment device affixed to the area of the resultant force. Many various configurations utilizing the invention will become apparent, when considering individual designs of support plates or segments. While the embodiment shown uses four discrete linings per segment, a single lining or any number of plural linings of various individual size in which the resultant force passes through the region of the attachment apparatus are included within the scope of this invention.

We claim:

1. A brake lining support in a disc brake for supporting a friction-type brake lining material between a rotating brake disc and a brake actuator comprising:
   at least one brake lining support segment;
   at least one brake lining pad attached to said segment;
   attachment means on said segment for attaching said segment to a non-rotating part of such disc brake;
   said at least one brake lining pad positioned on said segment so that the resulting force transmitted by said brake lining pad is generally directed through the region of said brake lining support segment where said attachment means is located, thereby minimizing the tilting moment of said lining support segment about said attachment means.

2. The brake lining support of claim 1 wherein said attachment means includes a recess in the brake lining support segment.

3. The brake lining support of claim 2 wherein said recess is located radially outward of the annular surfaces of said brake lining pad.

4. The brake lining support of claim 1 wherein said attachment means is located radially outward of friction surfaces of said brake lining pad.

5. The brake lining support of claim 1 wherein said at least one brake lining pad comprises four pads generally equally spaced circumferentially about the axis of such rotating brake disc.

6. The brake lining support of claim 5 wherein said pads have generally equal respective friction braking surfaces.

7. The brake lining support of claim 1 wherein said at least one brake lining pad includes a plurality of brake pads having generally equal friction braking surfaces.

8. The brake lining support of claim 7 wherein said pads are generally equally spaced circumferentially about said segment.

9. The brake lining support of claim 1 having a plurality of brake lining support segments.

10. The brake lining support of claim 9 wherein said segments have generally planar abutment surfaces on opposing ends of said segment extending generally radially outward from the axis of such brake disc.

11. The brake lining support of claim 1 having three support segments, said support segments each having four pads of generally equal friction braking surface, and said attachment means includes an outwardly opening recess spaced radially outward of said pads.

12. The brake lining support of claim 1 wherein said attachment means includes at least one abutment surface engagable with such attachment part, and said at least one pad is positioned on said segment such that the resulting force is directed to generally perpendicularly intersect said abutment surface on said attachment means.

* * * * *